United States Patent
Fukumitsu et al.

(10) Patent No.: US 11,745,284 B2
(45) Date of Patent: Sep. 5, 2023

(54) WELDING TORCH

(71) Applicant: Panasonic Intellectual Property Management Co., Ltd., Osaka (JP)

(72) Inventors: Yoichi Fukumitsu, Hyogo Ken (JP); Takashi Nagai, Hyogo Ken (JP); Shun Shibata, Hyogo Ken (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 481 days.

(21) Appl. No.: 17/046,104

(22) PCT Filed: Feb. 25, 2019

(86) PCT No.: PCT/JP2019/007130
§ 371 (c)(1),
(2) Date: Oct. 8, 2020

(87) PCT Pub. No.: WO2019/198356
PCT Pub. Date: Oct. 17, 2019

(65) Prior Publication Data
US 2021/0031292 A1    Feb. 4, 2021

(30) Foreign Application Priority Data
Apr. 9, 2018 (JP) ................................ 2018-074949

(51) Int. Cl.
*B23K 9/133* (2006.01)
*B23K 9/29* (2006.01)

(52) U.S. Cl.
CPC .............. *B23K 9/133* (2013.01); *B23K 9/295* (2013.01)

(58) Field of Classification Search
CPC ........ B23K 9/122; B23K 9/133; B23K 9/295; B23K 9/16
(Continued)

(56) References Cited

U.S. PATENT DOCUMENTS

| 9,061,366 B2 * | 6/2015 | Pinsonneault ......... B23K 9/173 |
| 2017/0165780 A1 | 6/2017 | Centner |
| 2018/0290227 A1 * | 10/2018 | Kachline ................ B23K 9/324 |

FOREIGN PATENT DOCUMENTS

| JP | 56-105872 | 8/1981 |
| JP | 59-94780 | 6/1984 |

(Continued)

OTHER PUBLICATIONS

English Translation of Abstract for JP-61086079-A, May 1986, Hattori T (Year: 1986).*

(Continued)

*Primary Examiner* — Dana Ross
*Assistant Examiner* — James F Sims, III
(74) *Attorney, Agent, or Firm* — Wenderoth, Lind & Ponack, L.L.P.

(57) ABSTRACT

A welding torch includes an inner tube of a helically wound wire to define a passage for a welding wire, a conduit in which the inner tube is inserted, the conduit having a curved portion, a torch body including a tip portion and a nozzle, a torch holder having a gas supplying member that supplies a shield gas into a space between the inner tube and the conduit, a feed unit provided upstream of the torch holder to feed the welding wire forward to or backward from the inner tube, and a sealing mechanism for preventing a reverse flow of the shield gas to the feed unit. A gap is defined between the adjacent wires of the inner tube allowing the shield gas to flow therethrough, and permitting wear debris generated by abrasion of the welding wire sliding in the inner tube to be ejected out from the nozzle.

3 Claims, 6 Drawing Sheets

(58) Field of Classification Search
USPC .................................................. 219/137.2
See application file for complete search history.

(56) References Cited

FOREIGN PATENT DOCUMENTS

| | | |
|---|---|---|
| JP | 61-74784 | 4/1986 |
| JP | 02-024189 | 5/1990 |
| JP | 09-38778 | 2/1997 |
| JP | 09-70665 | 3/1997 |

OTHER PUBLICATIONS

Extended European Search Report dated May 11, 2021 in corresponding European Patent Application No. 19784451.7.
International SearchReport dated Apr. 9, 2019 in International (PCT) Application No. PCT/JP2019/007130.

* cited by examiner

WELDING TORCH

CROSS REFERENCE TO RELATED APPLICATION

The present application is based on and claims priority with respect to Japanese Patent Application No. 2018-074949, filed on Apr. 9, 2018, of which the entire content is incorporated herein by reference into the present application.

TECHNICAL FIELD

The present invention relates to a welding torch used for a consumable electrode arc welding in which the arc welding is performed with a welding wire and a shielding gas supplied from the tip portion of the welding torch.

BACKGROUND OF THE INVENTION

The welding torch includes a torch body, a torch holder, and a feed unit.

The torch body includes an inner tube formed of a wire rod wound in a helical configuration to define a passage for a welding wire, a curved conduit to house the inner tube inserted therein, and a tip portion and a nozzle arranged close to a forward end of the conduit.

The torch holder includes a gas supply unit that supports a base end portion of the torch body and supplies a shield gas between the conduit and the inner tube.

The feed unit includes a feeding mechanism provided upstream of the torch holder, which is configured to feed the welding wire forward to or backward from the inner tube.

Japanese Laid-Open Patent Publication No. H09-70665 A discloses that the inner tube (referred to as a "conduit liner" therein) includes an inner surface which may have a substantial contact friction with the welding wire therein at the curved portion of the torch body when feeding the welding wire. The contact friction may cause the welding wire slipped at the feeding mechanism to break the arc, and/or to generate wear debris or powder thereof, which clog or stick in the inner tube. To address such problems, JP H09-70665 suggests a solution for the inner tube to design a wiring gap between adjacent wound wires to be a predetermined value or more to reduce the contact friction and suppress the wear debris.

SUMMARY OF THE INVENTION

1. Technical Problem

Meanwhile, the conventional welding torch includes a heat shrinking tube covering the inner tube to solve another drawback, that is, the shield gas supplied from the gas supply unit provided in the torch holder flows back to the feed unit arranged upstream of the torch holder. This may cause the wear debris in an even small amount to accumulate inside the inner tube to form a clog therein, which requires a disassembly cleaning of the welding torch in a routine or frequent basis.

To address the problem, one aspect of the present invention provides a welding torch that will prevent the clogging of the wear debris in the inner tube without requiring the frequent disassembly for cleaning thereof.

2. Solution to the Problem

One aspect of the present invention relates to a welding torch, which comprises an inner tube of a helically wound wire to define a passage for a welding wire, a conduit in which the inner tube is inserted, the conduit having a curved portion, a torch body including a tip portion and a nozzle arranged close to a forward end of the conduit, a torch holder supporting a base end portion of the torch body and having a gas supplying member that supplies a shield gas into a space between the inner tube and the conduit, a feed unit provided upstream the torch holder to feed the welding wire forward to or backward from the inner tube, and a sealing mechanism to prevent a reverse flow of the shield gas to the feed unit, wherein a gap is defined between the adjacent wires of the inner tube allowing the shield gas to flow therethrough, and wherein wear debris generated by abrasion of the welding wire sliding in the inner tube is ejected out from the nozzle through the gap.

Advantage of the Invention

According to an embodiment of the present invention, the welding torch is provided which prevents the clogging of the inner tube due to wear debris without requiring the frequent disassembly thereof for cleaning.

DETAILED DESCRIPTION OF THE INVENTION

With reference to attached drawings, a structure of the welding torch of an embodiment of the present invention will be described herein in detail.

Basic Embodiment

A welding torch includes an inner tube formed of a helically wound wire to define a passage for a welding wire; a conduit in which the inner tube is inserted, the conduit having a curved portion; a torch body including a tip portion and a nozzle arranged close to a forward end of the conduit; a torch holder supporting a base end portion of the torch body and having a gas supplying member that supplies a shield gas into a space between the inner tube and the conduit; a feed unit provided upstream the torch holder to feed the welding wire forward to or backward from the inner tube.

Also, welding torch includes a sealing mechanism wherein a gap is defined between the adjacent wires of the inner tube allowing the shield gas to flow therethrough, and wear debris generated by abrasion of the welding wire sliding in the inner tube is ejected out from the nozzle. The sealing mechanism is configured to prevent a reverse flow of the shield gas to the feed unit.

Also, the sealing mechanism includes a guide member attached to a base end portion of the inner tube, which guides the welding wire forward to or backward from the inner tube, and a sealing member provided between the guide member and the inner tube. Furthermore, the welding torch is configured to have the gap defined between the adjacent wires of the inner tube in one region that corresponds to the curved portion of the conduit that is narrower than that in the other regions of the inner tube.

Specific Embodiment

Figure 1:
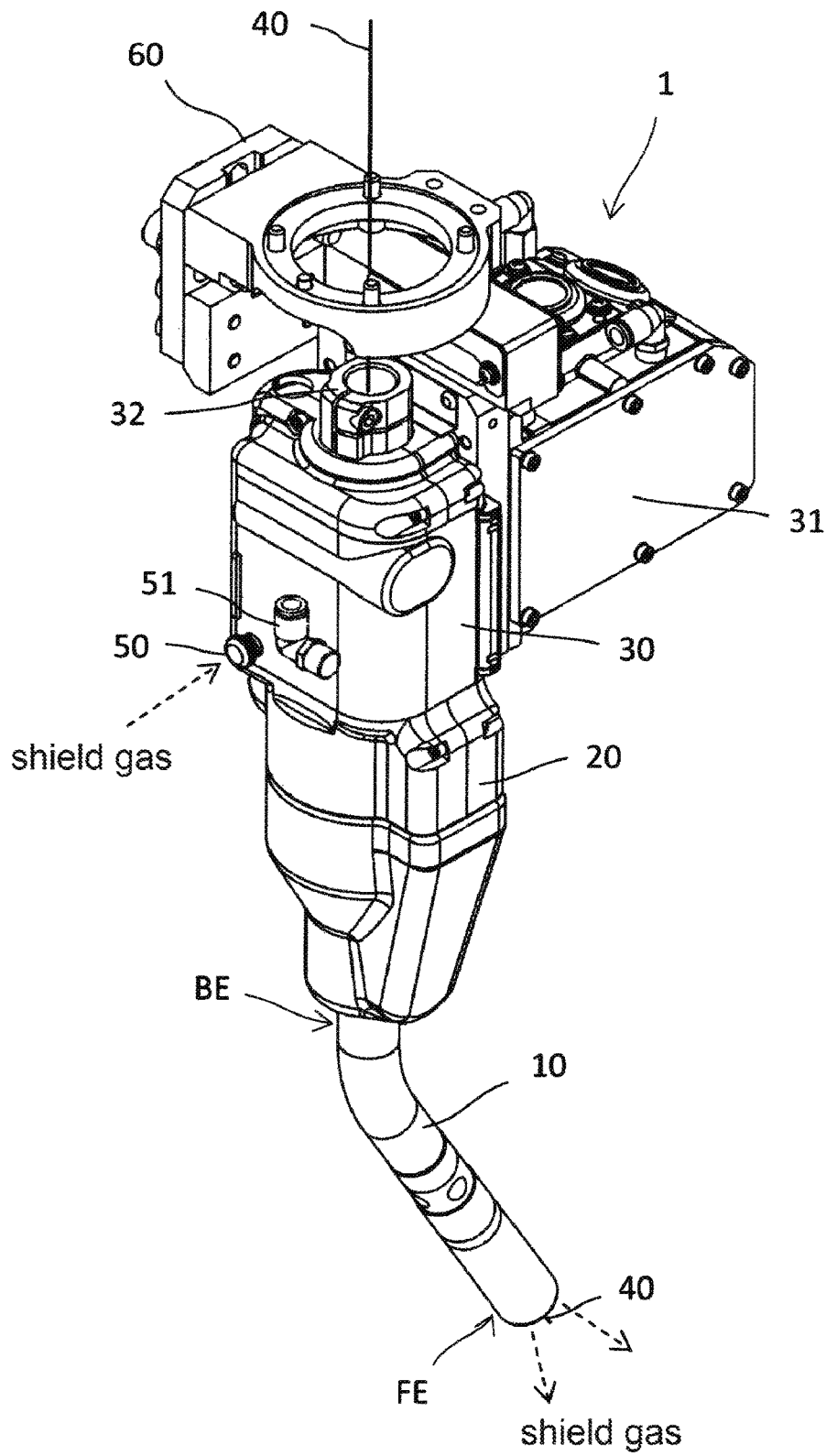
FIG. 1 is a perspective view of a welding torch.
Figure 2A:
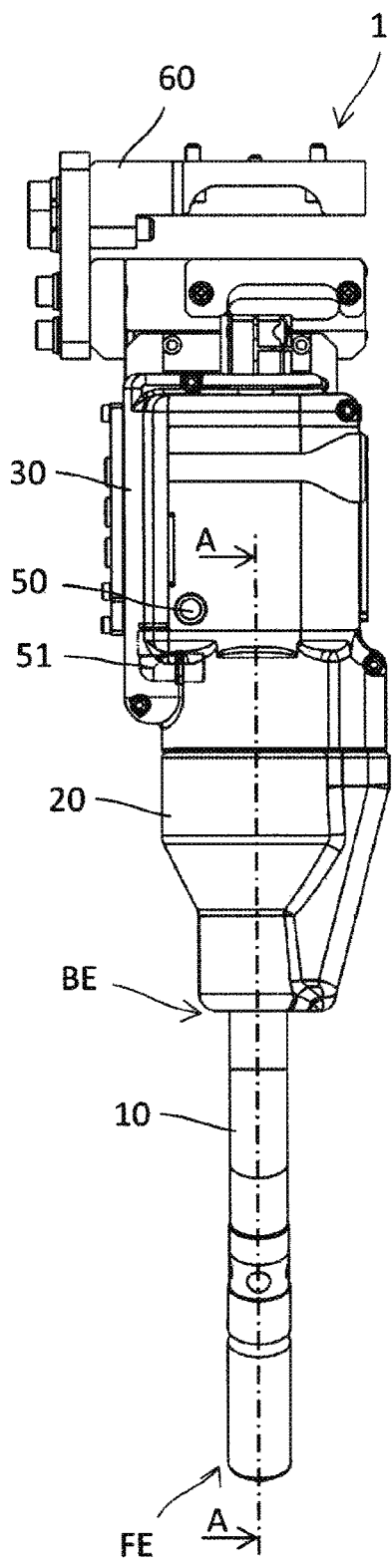
FIG. 2A is a front view of the welding torch and FIG. 2B is a side view thereof.
Figure 2B:
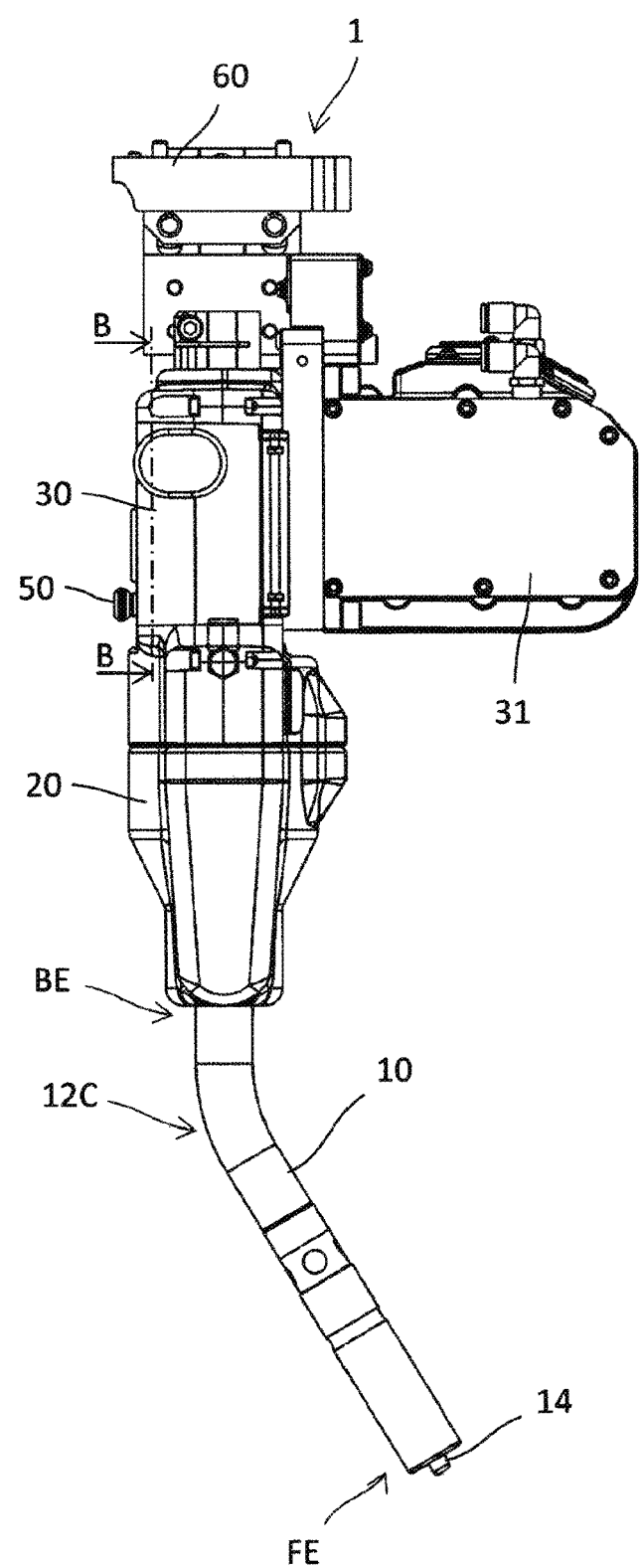

With reference to attached drawings, a structure of the welding torch will further be described herein in detail. As illustrated in FIG. 1 and FIGS. 2A and 2B, the welding torch 1 includes a torch body 10, a torch holder 20, and a feed unit 30, which is adapted to a consumable electrode arc welding apparatus. The welding torch 1 is configured to supply a shielding gas and a welding wire 40 from a forward end FE of the torch body 10 toward a welding object, and to weld the welding object while protecting a molten welding wire 40 with the shielding gas therearound.

The welding torch 1 is fixed to a tip (forward end) of a manipulator (not shown) configured as an articulated arm through a bracket 60 mounted on the feed unit 30. Also, the welding torch 1 is configured to weld the welding object according to the motion of the manipulator moving along a planned welding path (a scheduled welding locus) under control of a robot device (not shown).

Figure 3:
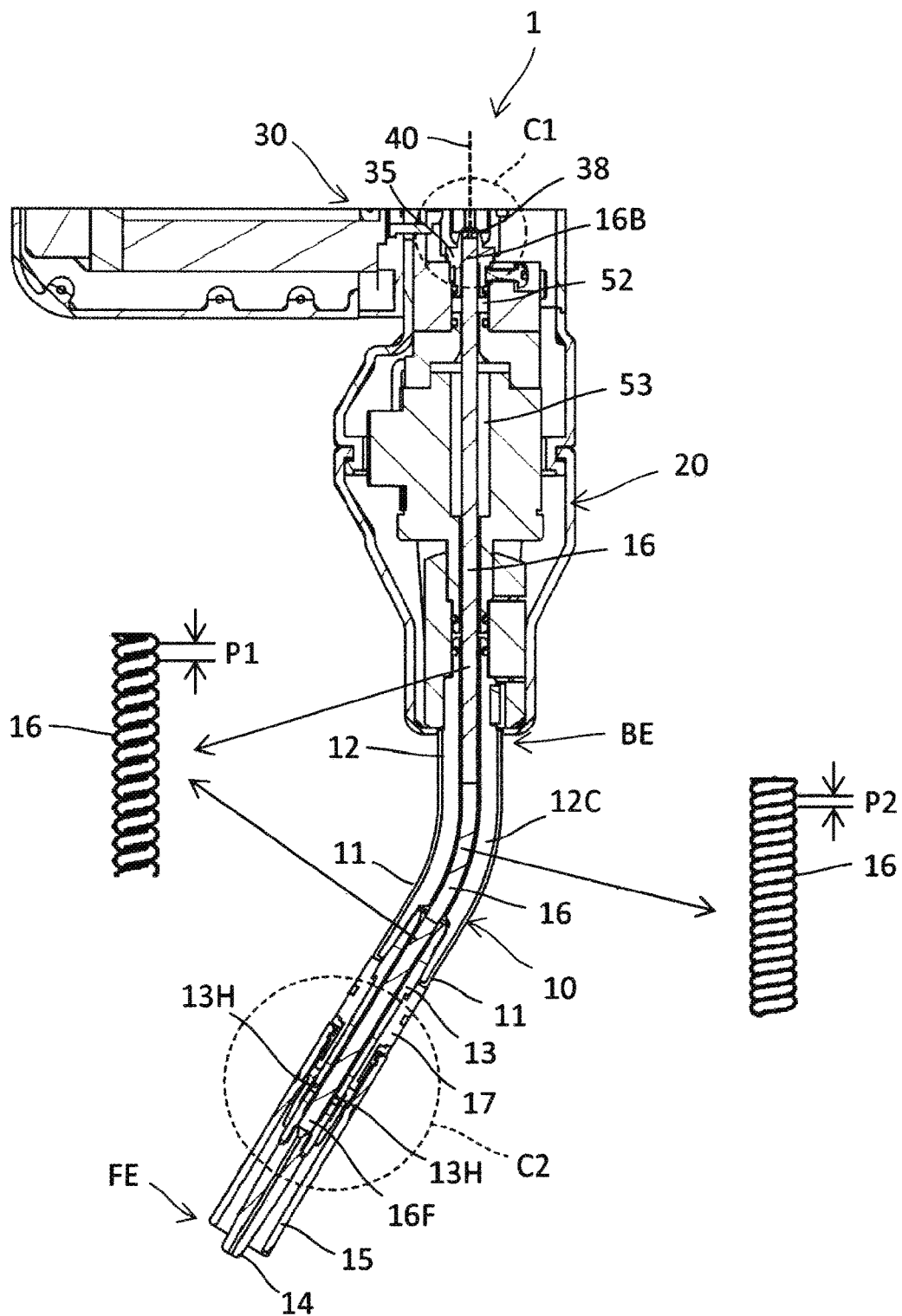
FIG. 3 is a cross-sectional view taken along line A-A of FIG. 2A.

As shown in FIG. 3, the torch body 10 includes an insulating member 11 and a conduit 12 encompassed by the insulating member 11. The conduit 12 is supported by the torch holder 20 at the base end portion BE of the torch body 10. A tip portion 14 is detachably attached to the conduit 12 through an externally threaded fitting by screwing the fitting 13 with the internally threaded section inside of the conduit 12, and also a nozzle 15 is attached to the conduit 12 through a nozzle holder 17 fixed to the fitting 13.

The conduit 12 is formed so as to extend straight from the base end portion BE of the torch body 10, but to have a curved portion 12C bending in a direction for a wider approach range to the welding object, and to further extends straight toward the forward end portion FE.

An inner tube 16 is arranged inside the conduit 12, which is made from an iron wire rod wound in a helical configuration to define a passage for the welding wire 40 extending therethrough. The inner tube 16 includes a base end portion 16B that is fixed to the lower guide member 35 provided in the feed unit 30, and the forward end 16F that is connected to the tip portion 14 by means of the fitting 13. The welding wire 40 is fed from the feed unit 30, inserted into the inner tube 16 from the base end portion 16B, and delivered through the tip portion 14 to the welding object.

As illustrated in FIG. 1 and FIGS. 2A and 2B, the torch holder 20 is provided with a pipe 51 (guiding conduit) for connection with a gas supply pipe or port 50 which is adapted to receive a supply of high-pressure shielding gas and deliver the shielding gas to the torch holder 20. Also, as illustrated in FIG. 3, the shielding gas supplied to the pipe 51 (see FIG. 1) is guided through a gas supply unit 52 arranged so as to surround the inner tube 16, to a gas passage 53 provided along the inner tube 16 in the longitudinal direction thereof and inside thereof. Then, the shielding gas passes along the inside of the conduit 12 and the inner tube 16 communicating with the gas passage 53 to be ejected from the forward end portion FE of the torch body 10.

Figure 4:
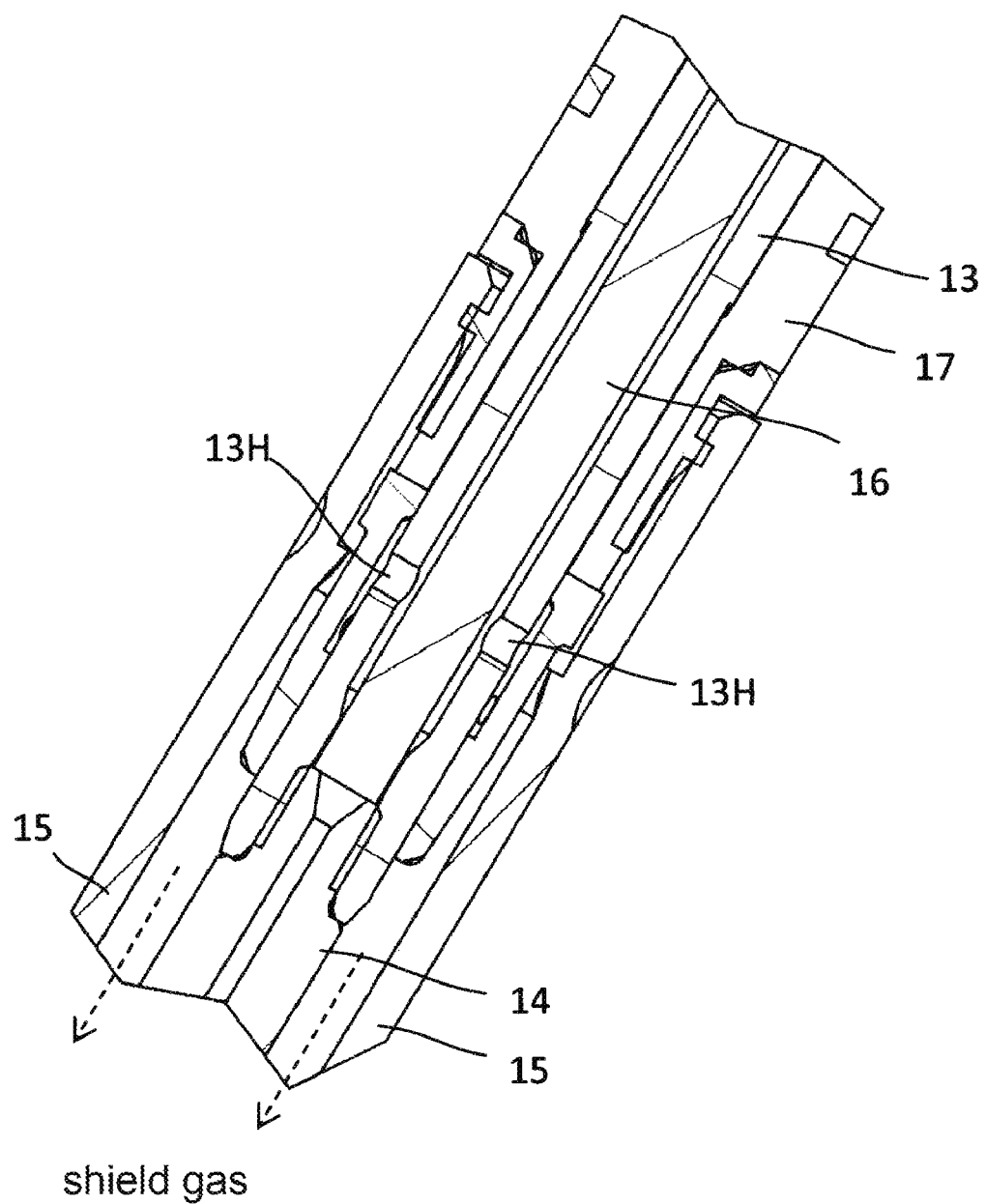
FIG. 4 is an enlarged view of a portion of the torch body which is surrounded by a dashed circle C2 in FIG. 3.

As shown in FIG. 4, the shielding gas flowing along the conduit 12 and the inner tube 16 is ejected through the gas ejection holes 13H formed in the fitting 13, which is screwed into engagement with the conduit 12, and through a cylindrical gap formed between the nozzle 15 attached to the nozzle holder 17 and the fitting 13 toward the welding target object.

Figure 5:
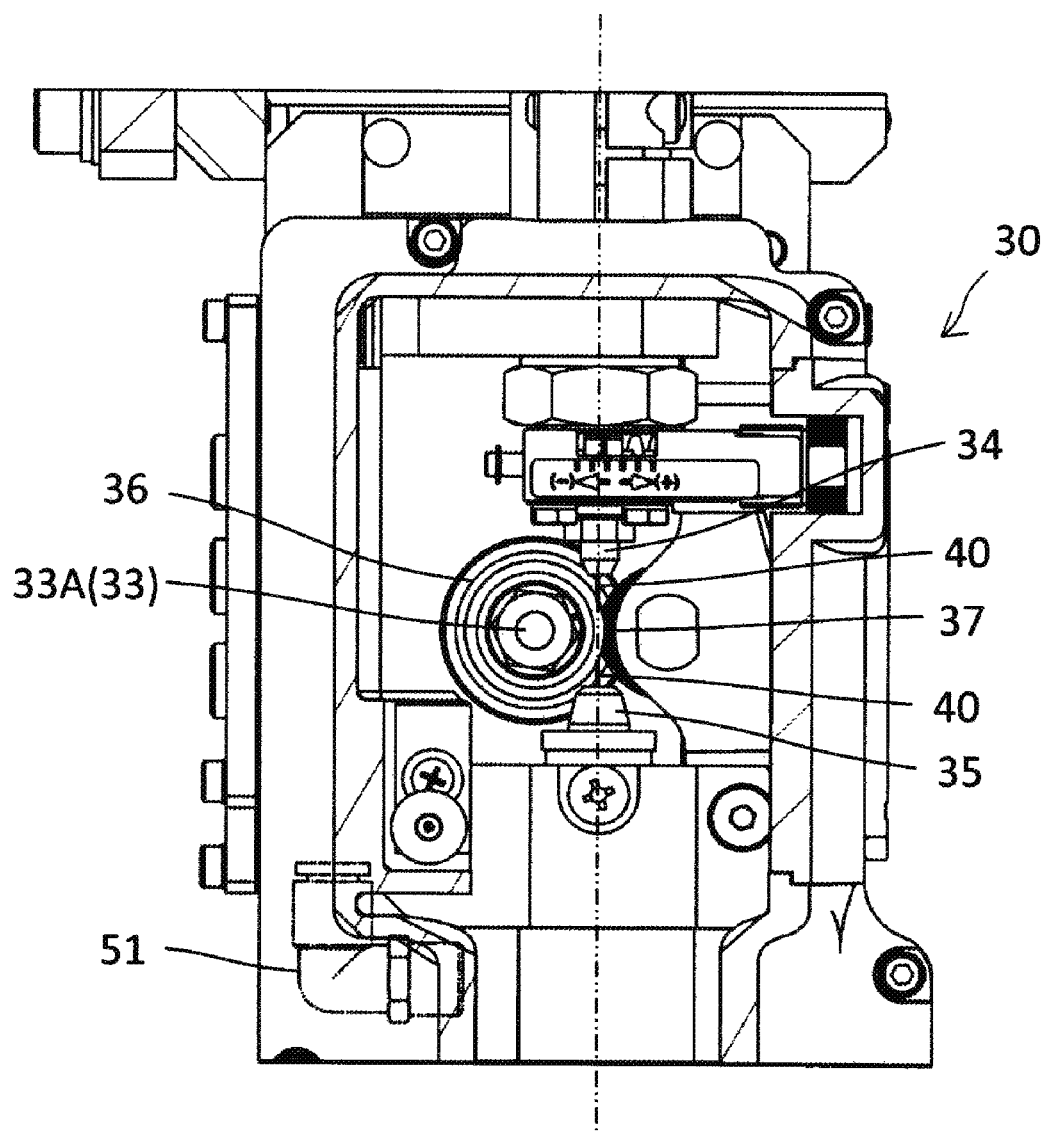
FIG. 5 is a cross-sectional view taken along line B-B of FIG. 2B.

As shown in FIG. 5, the feed unit 30 contains a feeding mechanism which includes a feed motor 33 housed in a motor casing 31 (see FIG. 1), a feed roller 36 attached to a drive shaft 33A of the feed motor 33, and a pressure roller 37 in pressure contact with the feed roller 36. Also, the feed unit 30 contains an upper guide member 34 and a lower guide member 35 provided above and below the feed motor 33 and the pressure roller 36, respectively.

Each of the upper and lower guide members 34, 35 includes a through-hole of a diameter substantially the same as a diameter of the welding wire 40. The welding wire 40 guided to a wire guiding aperture 32 arranged on the upper portion of the motor casing 31 (see FIG. 1) is inserted in the through-holes of the upper and lower guide members 34, 35 and then is introduced into the inner tube 16.

The feed roller 36 includes a V-shaped or U-shaped groove on a circumferential surface thereof for holding and positioning the welding wire 40. Thus, the welding wire 40 is pressed by and between the feed roller 36 and the pressure roller 37, and is fed forward towards the welding object by forward rotation of the feed motor 33 (forward feeding), and retrieved or fed backward away from the welding object by backward rotation of the feed motor 33 (backward feeding). The forward rotation and backward rotation of the feed motor 33 is controlled quickly so as to appropriately feed the welding wire 40 forward towards and backward from the welding object, thereby minimizing an amount of materials sputtering around the welding object while performing the arc welding.

Figure 6A:
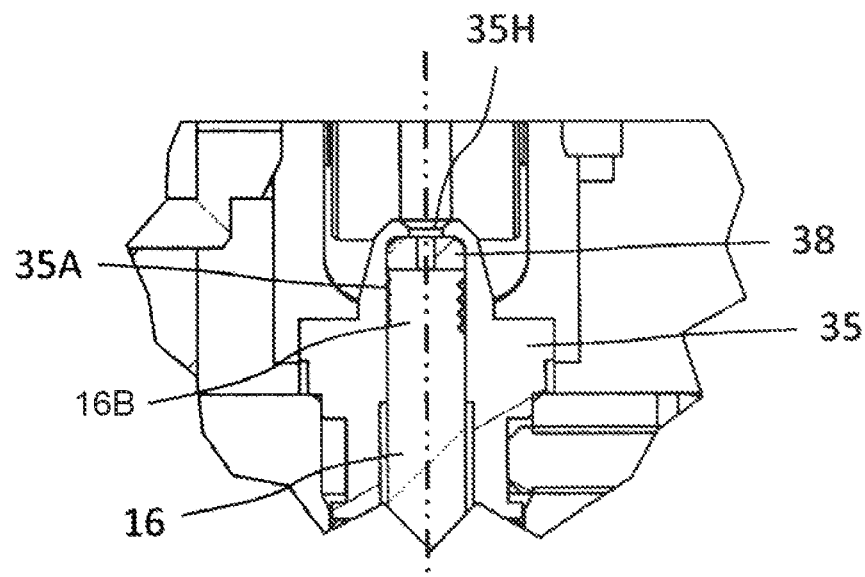
FIG. 6A is an enlarged view of another portion of the torch holder which is surrounded by a dashed circle C1 in FIG. 3.
Figure 6B:
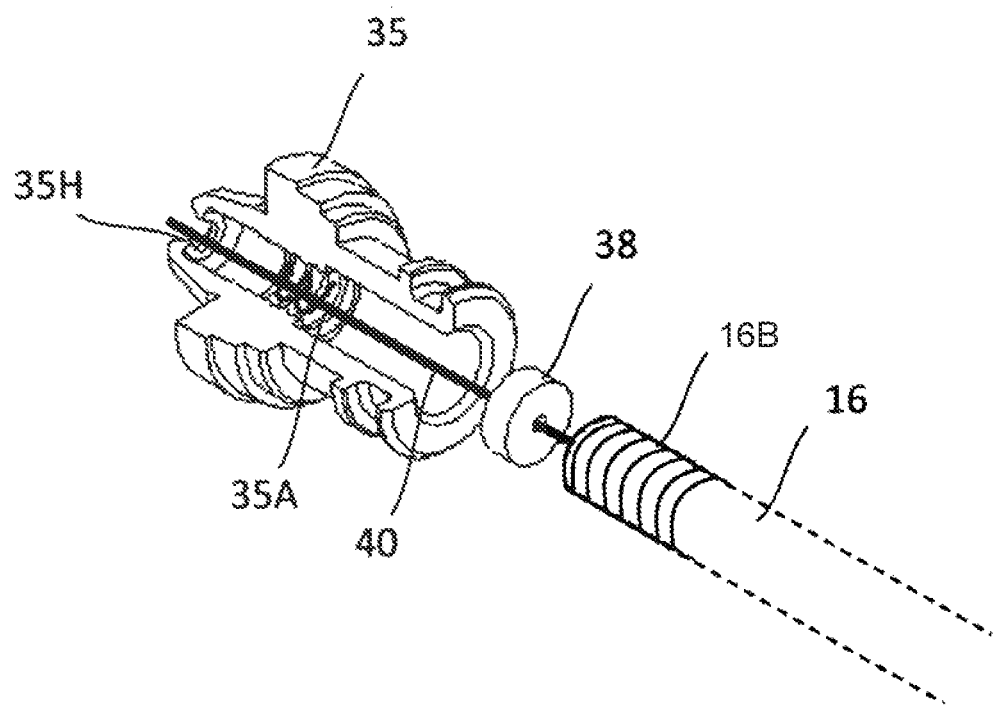
FIG. 6B is an exploded perspective view thereof.

As shown in FIGS. 6A and 6B, the lower guide member 35 has an internally threaded portion 35A in contact with the helical configuration of the wound inner tube 16, and the inner tube 16 is attached to the lower guide member 35 by screwing the base end portion 16B of the inner tube 16 into the internally threaded portion 35A of the lower guide member 35.

An elastic seal member 38 is provided between the lower guide member 35 and the inner tube 16 to prevent the high-pressure shielding gas injected through the gas supply unit 52 from leaking back into the feed unit 30 through an aperture 35H of the lower guide member 35. The seal member 38 may be made of material such as rubber and elastomer. Thus, the sealing mechanism is composed of the lower guide member 35 and the seal member 38. It should be noted that the double-dashed lines of FIGS. 5 and 6A denote a path of the welding wire 40.

When the welding object is welded with use of the welding torch 1 as described above, the feed unit 30 quickly iterates to feed the welding wire 40 forward to and backward from the welding object. In the forward feeding, the welding wire 40 receives a pushing force from the feeding mechanism but also receives a resistance force at the tip portion 14, which may increase a friction force at a curved portion of the inner tube 16 corresponding to the curved portion 12C of the conduit 12. Also, in the backward feeding, the welding wire 40 receives a pulling force from the feeding mechanism but again receives the resistance force at the tip portion 14, which may increase the friction force at the curved portion of the inner tube 16 corresponding to the curved portion 12C of the conduit 12. Such friction between the welding wire 40 and the inner tube 16 may substantially increase thereby generating wear debris or abrasion powder from the welding wire 40.

To address the wear debris, the welding torch 1 is configured to provide gaps between the adjacent wound wires of the inner tube 16 allowing the shielding gas to flow therethrough to eject the wear debris of the welding wire 40 together with the shielding gas from the nozzle 15.

The inner diameter of the inner tube 16 is designed to be slightly larger (for example, by about 0.5 mm) than the outer diameter of the welding wire 40, and the inner diameter of the conduit 12 is designed to be sufficiently larger (for example, by about 2 mm) than the outer diameter of the inner tube 16. The opening diameter of the tip portion 14 is designed to be substantially the same as the outer diameter of the welding wire 40.

Therefore, the wear debris having a particle size of several tens of μm to several hundreds of μm passes together with the shielding gas, through the gaps between the adjacent wound wires of the inner tube 16, a channel between the conduit 12 and the inner tube 16, and the gas ejection holes 13H formed in the fitting 13 to the nozzle 15, rather than through the inner tube 16 to the tip portion 14.

Also, since the sealing mechanism is provided as described above, the wear debris passing through the gaps into the conduit 12 is blocked from flowing back into the feed unit 30 with the shielding gas so as to prevent deterioration of the feeding performance of the feeding mechanism.

Furthermore, as shown in FIG. 3, the inner tube 16 has a curved portion corresponding to the curved portion 12C of the conduit 12, in which the wear debris is more likely to be generated, and the winding pitch P2 of the inner tube 16 in the curved portion is designed to be less than the winding pitch P1 in the upstream and downstream straight portions thereof. This reduces the contact pressure in the curved portion between the inner tube 16 and the welding wire 40 to suppress the wear debris, and allows the wear debris in the straight portions to readily pass through the gaps having greater winding pitch P1.

That is, the inner tube 16 may be configured so that the winding pitch P2 in a region corresponding to the curved portion 12C is less than the winding pitches of other regions. The specific values of the winding pitches P1 and P2 are not limited to particular ones, and may be appropriately selected in accordance with the particle size of the wear debris, the targeted contact pressure in the curved portion, and the like.

The shielding gas may be any of gases for inhibiting a reaction between oxygen and molten metal (welding wire, etc.) during welding, which is generally argon gas or helium gas that does not chemically react with molten metal, and also may be mixed with carbon dioxide or the like.

Needless to mention, the above-described embodiment is merely an example for description of the present invention, and the specific configuration of each component is not limited to the specific example as above, and may be appropriately modified and designed within the range in which the advantages of the present invention are achieved.

According to the present invention, it is possible to provide a welding torch in which wear debris from the welding wire is ejected from the nozzle together with the shielding gas, allowing a long-term welding operation without the necessity of performing cleaning work.

REFERENCE NUMERALS

1: welding torch, 10: torch body, 11: insulating member, 12: conduit, 12C: curved portion, 13: fitting, 13H: gas ejection hole, 14: tip portion, 15: nozzle, 16: inner tube, 17: nozzle holder, 20: torch holder, 50: gas supply pipe, 51: pipe, 52: gas supply unit, 53: gas passage, 30: feed unit, 31: motor casing, 32: wire guiding aperture, 33: feed motor (feeding mechanism), 34: upper guide member, 35: lower guide member, 36: feed roller (feeding mechanism), 37: pressure roller (feeding mechanism), 38: sealing member, 40: welding wire, 60: bracket

What is claimed is:

1. A welding torch, comprising:
   an inner tube formed of a helically wound wire, the inner tube defining a passage for a welding wire;
   a conduit in which the inner tube is inserted, the conduit having a curved portion;
   a torch body including a tip portion and a nozzle arranged close to a forward end of the conduit;
   a torch holder supporting a base end portion of the torch body and having a gas supply pipe for supplying a shield gas via a guiding conduit into a space between the inner tube and the conduit;
   a wire feeder provided upstream of the torch holder to feed the welding wire forward to or backward from the inner tube; and
   a seal for preventing a reverse flow of the shield gas to the feed unit;
   wherein a gap is defined between adjacent wire segments of the helically wound wire of the inner tube allowing the shield gas to flow therethrough,
   wherein wear debris generated by abrasion of the welding wire sliding in the inner tube can be ejected out from the nozzle through the gap,
   wherein the conduit further comprises an upstream portion that extends upstream from the curved portion and a downstream portion that extends downstream from the curved portion, and
   wherein the gap defined between the adjacent wire segments of the inner tube in a region that corresponds to the curved portion of the conduit is narrower than the gap in regions that correspond to the upstream and downstream portions of the conduit.

2. The welding torch according to claim 1,
   further comprising a guide member attached to a base end portion of the inner tube, wherein the seal is provided between the guide member and the inner tube,
   wherein the guide member is configured to guide the welding wire into the inner tube.

3. The welding torch according to claim 1, wherein the wire feeder comprises a feed motor housed in a motor casing, a feed roller attached to a drive shaft of the feed motor, and a pressure roller in pressure contact with the feed roller.

* * * * *